US007667880B2

(12) United States Patent
Borg

(10) Patent No.: US 7,667,880 B2
(45) Date of Patent: Feb. 23, 2010

(54) METHOD AND APPARATUS FOR PREVIEWING DIGITAL MOTION PICTURE CONTENT

(75) Inventor: Lars U. Borg, Saratoga, CA (US)

(73) Assignee: Adobe Systems, Incorporated, San Jose, CA (US)

( * ) Notice: Subject to any disclaimer, the term of this patent is extended or adjusted under 35 U.S.C. 154(b) by 572 days.

(21) Appl. No.: 11/351,757

(22) Filed: Feb. 10, 2006

(65) Prior Publication Data

US 2007/0189381 A1 Aug. 16, 2007

(51) Int. Cl.
*H04N 1/46* (2006.01)

(52) U.S. Cl. .................. 358/504; 358/1.9; 358/406; 358/518; 382/162; 382/167; 345/593; 345/604; 348/96; 348/97; 348/234; 348/235; 348/238

(58) Field of Classification Search .......... 358/1.9, 358/518; 382/162, 167; 348/96–97, 234–235, 348/238; 345/431, 593, 604; 702/127
See application file for complete search history.

(56) References Cited

U.S. PATENT DOCUMENTS

| | | | |
|---|---|---|---|
| 4,839,721 A | 6/1989 | Abdulwahab et al. | |
| 4,992,861 A | 2/1991 | D'Errico | |
| 5,057,913 A | 10/1991 | Nagata et al. | |
| 5,140,414 A | 8/1992 | Mowry | |
| 5,255,083 A | 10/1993 | Capitant et al. | |
| 5,457,491 A | 10/1995 | Mowry | |
| 5,641,596 A | 6/1997 | Gray et al. | |
| 5,754,184 A * | 5/1998 | Ring et al. | 345/604 |
| 5,841,512 A | 11/1998 | Goodhill | |
| 6,014,165 A | 1/2000 | McIntyre et al. | |
| 6,075,887 A | 6/2000 | Brett | |
| 6,296,994 B1 * | 10/2001 | Sowinski et al. | 430/505 |

(Continued)

FOREIGN PATENT DOCUMENTS

EP 1104175 5/2001

(Continued)

OTHER PUBLICATIONS

PCT International Search Report for application PCT/US2007/061623 mailed Jul. 10, 2007.

*Primary Examiner*—Mark K Zimmerman
*Assistant Examiner*—Dung D Tran
(74) *Attorney, Agent, or Firm*—Robert C Kowert; Meyertons, Hood, Kivlin, Kowert & Goetzel, P.C.

(57) ABSTRACT

One embodiment of the present invention provides a system that generates a look-up table which can be used to preview digital motion picture content. During operation, the system receives an analytical model for a digital motion picture workflow. Next, the system selects a set of input pixel values. The system then determines a set of output pixel values using the set of input pixel values and the analytical model. Finally, the system generates the look-up table by associating the set of input pixel values with the set of output pixel values. The analytical model comprises a number of models that capture the various stages in the digital motion picture workflow. These models can include a recorder model, a negative film model, a printer model, a positive film model, and a projector model.

22 Claims, 8 Drawing Sheets

U.S. PATENT DOCUMENTS

| | | | |
|---|---|---|---|
| 6,603,483 B1* | 8/2003 | Newman | 345/593 |
| 6,671,000 B1 | 12/2003 | Cloutier | |
| 6,710,896 B1* | 3/2004 | Takaoka | 358/1.9 |
| 6,731,402 B1* | 5/2004 | Uchida et al. | 358/1.9 |
| 6,809,837 B1* | 10/2004 | Mestha et al. | 358/1.9 |
| 6,864,915 B1 | 3/2005 | Guimares et al. | |
| 6,987,586 B2* | 1/2006 | Bogdanowicz et al. | 358/1.9 |
| 7,053,927 B2 | 5/2006 | Jones et al. | |
| 7,197,182 B2* | 3/2007 | Selan | 382/167 |
| 7,272,257 B2* | 9/2007 | Toba | 382/162 |
| 7,486,422 B2* | 2/2009 | Guo | 358/474 |
| 2003/0095802 A1* | 5/2003 | Mimaki et al. | 396/564 |
| 2005/0122536 A1 | 6/2005 | Selan | |
| 2006/0181721 A1* | 8/2006 | Kulkarni et al. | 358/1.9 |
| 2007/0098256 A1* | 5/2007 | Kulkarni et al. | 382/162 |

FOREIGN PATENT DOCUMENTS

| | | |
|---|---|---|
| EP | 1237379 | 9/2002 |
| WO | WO 95/21502 | 8/1995 |
| WO | WO/00/26857 | 5/2000 |

\* cited by examiner

METHOD AND APPARATUS FOR PREVIEWING DIGITAL MOTION PICTURE CONTENT

BACKGROUND

1. Field of the Invention

The present invention relates to techniques for manipulating digital images. More specifically, the present invention relates to a method and an apparatus for previewing digital motion picture content.

2. Related Art

As computer systems are becoming more powerful, they are increasingly being used for computationally intensive image-processing tasks. Specifically, the motion picture industry is increasingly relying on computer systems to modify and preview films.

FIG. 1 presents a flowchart that illustrates a digital motion picture workflow.

A typical digital motion picture workflow begins when scene 102 is captured on negative film 104 by a camera. Next, the camera's negative film 104 is scanned to produce digital picture file 106. Note that the digital picture file can be encoded in a number of file formats. For example, the digital picture file can be a DPX/Cineon file.

The digital picture file can then be edited on a computer system and recorded onto negative film 110. Next, negative film 110 can be processed to produce positive print film 112. Finally, the positive print film can be shown in a theatre by projecting it on theatre screen 114.

Editing a digital picture file on a computer system can adversely affect the appearance of the edited scenes when they are projected on a theatre (or cinema) screen. Specifically, scenes or special effects that were added or manipulated during the editing process may not match the look and feel of unedited scenes. Hence, it is very important to be able to preview the motion picture as it will appear on the theatre screen so that such discrepancies can be fixed before the film is developed.

Note that digital picture file 106 can be used to generate preview 108 of the digital motion picture as it would appear on the theatre screen 114. Some prior art techniques use a look-up table to convert input pixel values in digital picture file 106 to output pixel values that correspond to what appears on theatre screen 114.

Usually, prior art techniques use empirical techniques to generate the look-up table. A special digital picture file that contains a number of color patches is developed and projected onto a theatre screen. Next, the color of a region in the projected picture is compared with the color of the corresponding region in the digital picture file to determine the value of the corresponding entry in the look-up table.

Unfortunately, these prior art techniques have a number of disadvantages. First, these techniques are time consuming and labor intensive because they require the color patch picture to be developed before the look-up table can be determined. Second, the film development process can produce variable results which can adversely affect the accuracy of the look-up table. Third, the measured values are subject to instrument noise, especially in dark patches, which can also decrease the accuracy of the look-up table. Finally, these prior art techniques are usually not flexible, i.e., if even one of the steps in the motion picture workflow is modified, the whole film development process has to be repeated to generate a new look-up table that captures the effect of the modified workflow.

Hence, what is needed is a method and an apparatus to preview digital picture content on a computer monitor as it would appear projected in a theatre without the above-described drawbacks.

SUMMARY

One embodiment of the present invention provides a system that generates a look-up table which can be used to preview digital picture content. During operation, the system receives an analytical model for a digital motion picture workflow. Next, the system selects a set of input pixel values. The system then determines a set of output pixel values using the set of input pixel values and the analytical model. Finally, the system generates the look-up table by associating the set of input pixel values with the set of output pixel values.

In a variation on this embodiment, the analytical model comprises a number of models that capture the various stages in the digital motion picture workflow. These models can include a recorder model, a negative film model, a printer model, a positive film model, and a projector model. The recorder model captures the behavior of a recorder which records the visual information contained in a digital picture file onto a color negative film. The negative film model captures the behavior of the color negative film when the color negative film is exposed to light by the recorder. The printer model captures the behavior of a printer which prints the visual information contained in the color negative film onto a color positive film. The positive film model captures the behavior of the color positive film when the color positive film is exposed to light by the printer. Finally, the projector model captures the behavior of a film projector that projects the visual information contained in the positive film onto a theatre screen.

In a further variation on this embodiment, the negative film model uses a characteristic curve for the negative film which is determined by first receiving a spectral dye density curve, a standardized pixel value, and a standardized density value. Next, the system determines a relationship between a status density value and a dye amount using the spectral dye density curve. The system then determines the characteristic curve for the negative film by calibrating the relationship using the pixel value and the density value.

In a further variation on this embodiment, the positive film model uses a characteristic curve for the positive film which is determined by first receiving a spectral dye density curve, a standardized pixel value, and a standardized density value. Next, the system determines a relationship between a status density value and a dye amount using the spectral dye density curve. The system then determines the characteristic curve for the positive film by calibrating the relationship using the pixel value and the density value.

In a variation on this embodiment, the input pixel values are in DPX format, and the output pixel values are in CIELAB color space.

One embodiment of the present invention provides a system that generates a preview of a digital picture. During operation, the system receives a look-up table which was generated using an analytical model for a digital picture workflow. Next, the system receives an input digital picture file that contains digital picture content. The system then generates the preview of the digital picture content using the pixel values in the input digital picture file and the look-up table.

One embodiment of the present invention provides a system that generates a preview of a digital picture. During operation, the system receives an analytical model for a digital motion picture workflow. Next, the system receives an input digital picture file that contains digital picture content. The system then generates the preview of the digital picture content using the pixel values in the input digital picture file and the analytical model.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The datastructures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Characteristic Curves

A characteristic curve plots the relationship between the amount of exposure that is given to a film and the corresponding density after processing the film. The density values are typically measured on a film test strip that is exposed in a sensitometer under carefully controlled conditions, and processed under equally controlled conditions.

The range of densities in the test strip usually simulates most picture taking situations. The amount of exposure (measured in lux) received by each step on the test strip is multiplied by the exposure time (measured in seconds) to produce exposure values in units of lux-seconds. The logarithms (base 10) of the exposure values are plotted on the horizontal scale to produce the characteristic curve. This curve is also known as the sensitometric curve, the D Log H curve, or the H & D (Hurter and Driffield) curve. Note that usually there are multiple characteristic curves for a color film, e.g., one for each color channel.

Figure 1:
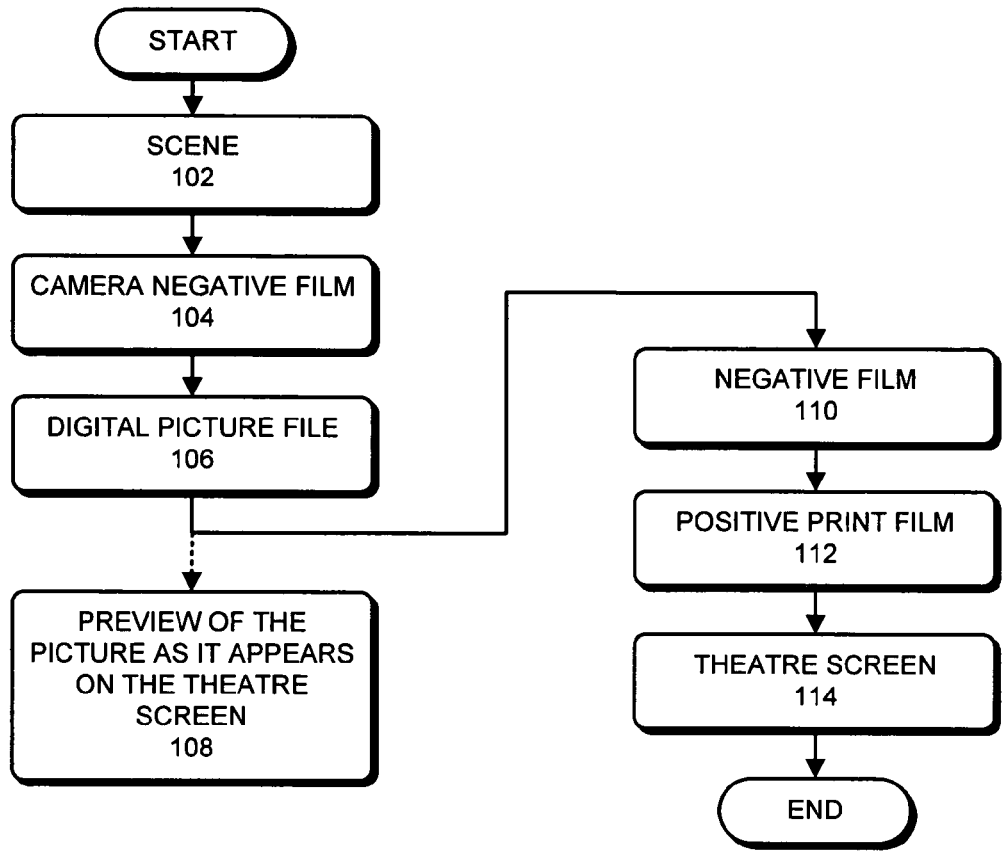
FIG. 1 presents a flowchart that illustrates a digital motion picture workflow.
Figure 2:
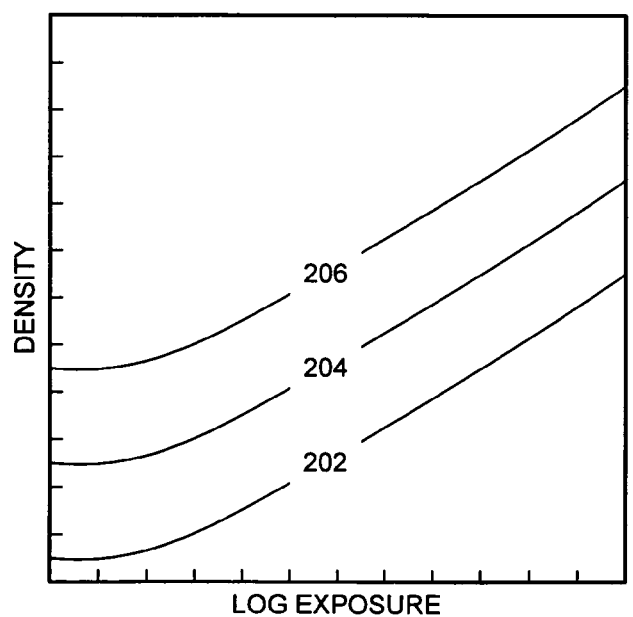
FIG. 2 illustrates characteristic curves for a color negative film in accordance with an embodiment of the present invention.

FIG. 2 illustrates characteristic curves for a color negative film in accordance with an embodiment of the present invention.

Curves 202, 204, and 206 are exemplary characteristic curves for a red modulating dye layer (cyan colored), green modulating dye layer (magenta colored), and blue modulating dye layer (yellow colored), respectively.

Regardless of film type, all characteristic curves typically have five regions: D-min (minimum density), the toe, the straight-line portion, the shoulder and D-max (maximum density).

In color negatives, the base density (or D-min) value corresponds to the minimum exposure required to record a change in the density of the negative film. In other words, base density is the density of a fixed-out (all silver removed) negative or positive film that is neither exposed nor developed. Net densities produced by exposure and development are usually measured from the base density.

The toe is the portion of the characteristic curve where the slope (or gradient) increases gradually with constant changes in exposure. The straight-line portion is the portion of the curve where the slope does not change. For optimum results, all significant picture information should be placed on the straight-line portion. The shoulder is the portion of the curve where the slope decreases. Exposures beyond the maximum density (D-max) do not increase the density of the film.

Status Densitometry

The characteristic curve for a test film exposed and processed as described above is the "absolute" or "real" characteristic curve of a particular film processed using a particular processing technology.

However, sometimes it is necessary to establish that the values produced by one densitometer are comparable to those produced by another one. Status densitometry is used to achieve this standardization. Status densitometry refers to measurements made on a densitometer that conform to a specific spectral response.

The densities of positive films are usually measured by Status A densitometry using a standard set of carefully matched filters. Likewise, the densities of negative films are usually measured by Status M densitometry which uses a different set of carefully matched filters. Typically the densitometer filter sets are provided by the manufacturers of the densitometers.

Spectral Sensitivity Curves

Spectral sensitivity describes the relative sensitivity of the emulsion to the spectrum within the film's sensitivity range. Typically, color films have multiple spectral sensitivity curves: one for each color channel.

Spectral sensitivity curves can be generated by exposing a color film to radiation (or light) of specific wavelengths and measuring the resulting sensitivity. The wavelength of the light is typically expressed in nanometers and the sensitivity is expressed as the reciprocal of the exposure (ergs/cm$^2$) that is required to produce a specific density. The wavelength of the light is plotted along the X-axis, and the logarithm of sensitivity is plotted along the Y-axis.

Figure 3:
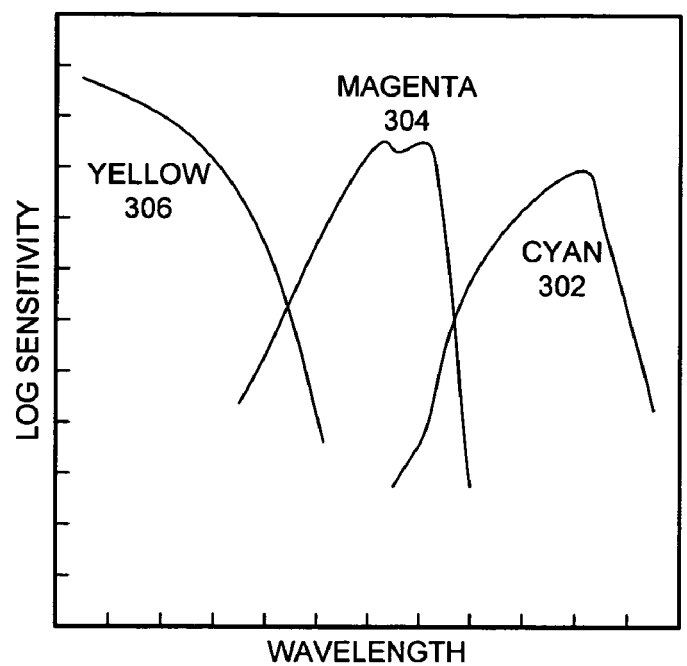
FIG. 3 illustrates the spectral sensitivity curves for a color negative film in accordance with an embodiment of the present invention.

FIG. 3 illustrates the spectral sensitivity curves for a color negative film in accordance with an embodiment of the present invention.

Exemplary spectral sensitivity curves 302, 304, and 306 correspond to the red-sensitive (cyan-dye forming), the green-sensitive (magenta-dye forming), and the blue-sensitive (yellow-dye forming) emulsion layers, respectively.

Spectral Dye Density Curves

Processing exposed color film typically produces cyan, magenta, and yellow dye images in the three separate layers of the film. The spectral dye density curves indicate the absorption of light by each color dye at different wavelengths. Spectral dye density curves usually represent dyes normalized to form a visual neutral density of 1.0 for a specified viewing and measuring illuminant. The light wavelengths (e.g., in nanometers) are usually plotted along the X-axis, and the spectral densities are plotted on the Y-axis.

Ideally, a color dye should absorb only in its own region of the spectrum. However, note that all color dyes absorb some wavelengths in other regions of the spectrum.

Figure 4:
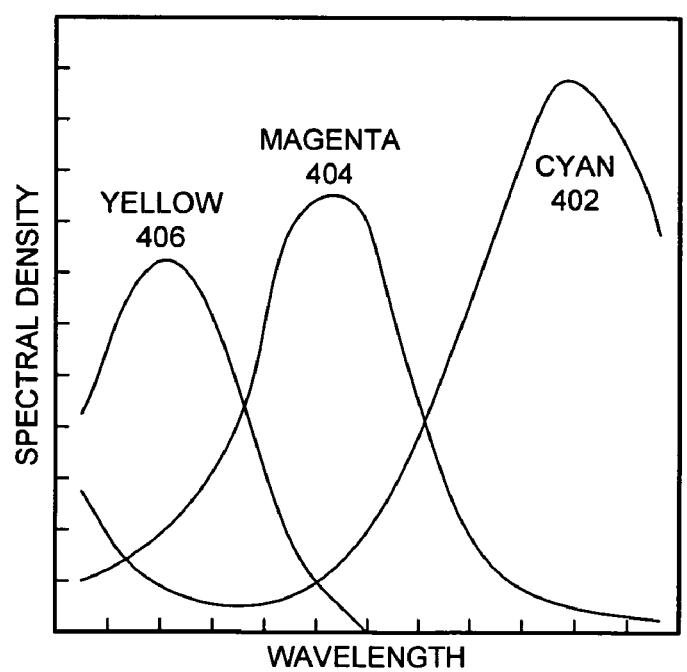
FIG. 4 illustrates the spectral dye density curves for a color negative film in accordance with an embodiment of the present invention.

FIG. 4 illustrates the spectral dye density curves for a color negative film in accordance with an embodiment of the present invention.

Exemplary spectral dye density curves 402, 404, and 406 correspond to the cyan, magenta, and yellow dyes, respectively.

Laboratory Aim Density (LAD)

Laboratory Aim Density (LAD) printing control techniques allow calibration of film processing equipment (e.g., printers and recorders) so that they truthfully reproduce the desired colors in the picture. Specifically, for a negative color film, a standard control patch specifies densities midway between the minimum and maximum of those typically obtained for a normal camera exposure. These color patches can be used to calibrate film processing equipment, such as a recorder or a printer.

One embodiment of the present invention uses LAD data to calibrate the characteristic curves for a color film.

Analytical Model for a Motion Picture Workflow

Figure 5:
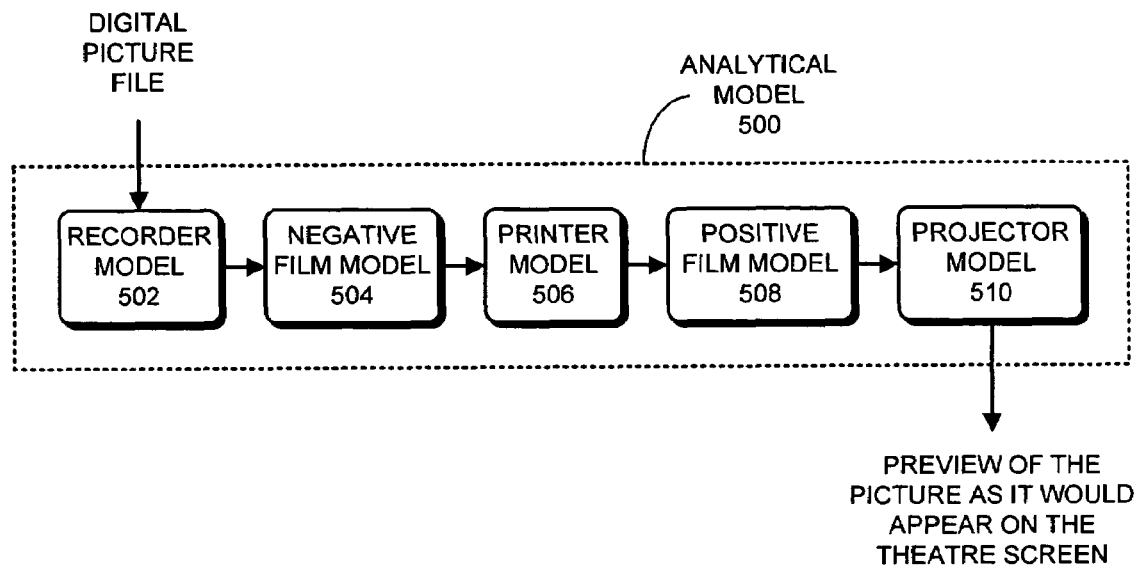
FIG. 5 presents a block diagram that illustrates an analytical model for a motion picture workflow in accordance with an embodiment of the present invention.

FIG. 5 presents a block diagram that illustrates an analytical model for a motion picture workflow in accordance with an embodiment of the present invention.

Analytical model 500 for a motion picture workflow comprises a number of components which model the various steps in the motion picture workflow.

Recorder model 502 models the behavior of a recorder as it records the visual information contained in a digital picture file onto a color negative film. Typically, a color recorder generates light by modulating a red, green, and blue laser based on the pixel values in the digital picture file.

In one embodiment, recorder model 502 determines the spectral characteristics of the light generated by the recorder based on the input pixel values. In other words, recorder model 502 determines the power spectrum of the light generated by the recorder using the pixel values in the digital picture file.

Figure 6:
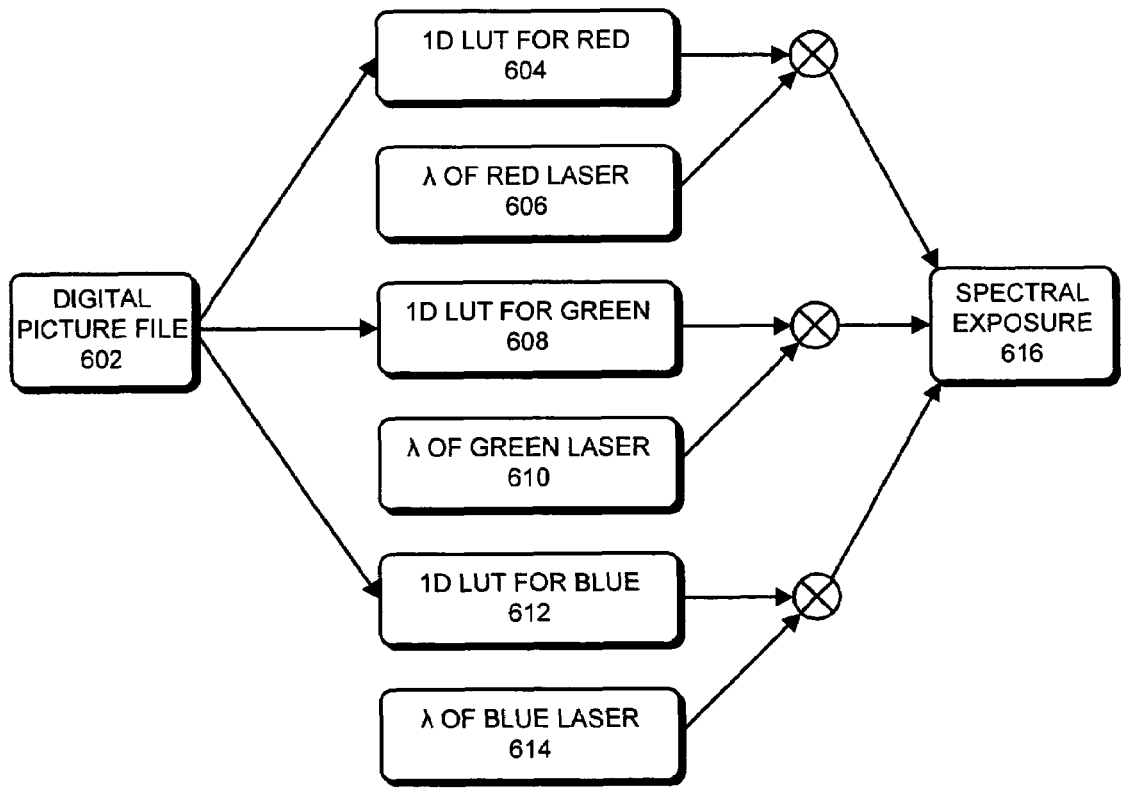
FIG. 6 illustrates a recorder model in accordance with an embodiment of the present invention.

FIG. 6 illustrates a recorder model in accordance with an embodiment of the present invention.

Each pixel in digital picture file 602 can be associated with a red, green, and blue color channel value. These color channel values can be used to determine the modulation amounts for red laser 606, green laser 610, and blue laser 614. Specifically, the 1-dimension look-up tables 604, 608, and 612 can be used to determine the modulation amounts for the red, green, and blue lasers, respectively. Note that these modulation amounts determine the intensity of the lasers, which, in turn, affect the dye densities in the negative film. In one embodiment, the 1-dimension look-up tables are calibrated so that a standardized pixel value generates a standardized dye density in the negative film.

Referring back to FIG. 5, negative film model 504 models the behavior of the color negative film when it is exposed to light by the recorder. Recall that we used recorder model 502 to determine the power spectrum of the light incident on the color negative film. Further, recall that a color negative film responds to a spectral exposure according to its characteristic curves. Hence, we can determine the dye densities using the power spectrum of the incident light and the characteristic curves. Further, note that each dye is associated with a spectral dye density curve. Hence, using the dye densities and the spectral dye density curves, we can determine the spectral transmittance of the color negative film.

In other words, the negative film model 504 determines the spectral transmittance of the negative film based on the power spectrum of the recorder's light. Note that each pixel in the digital picture file is associated with a region in the color negative film which, in turn, is associated with a spectral transmittance.

Figure 7:
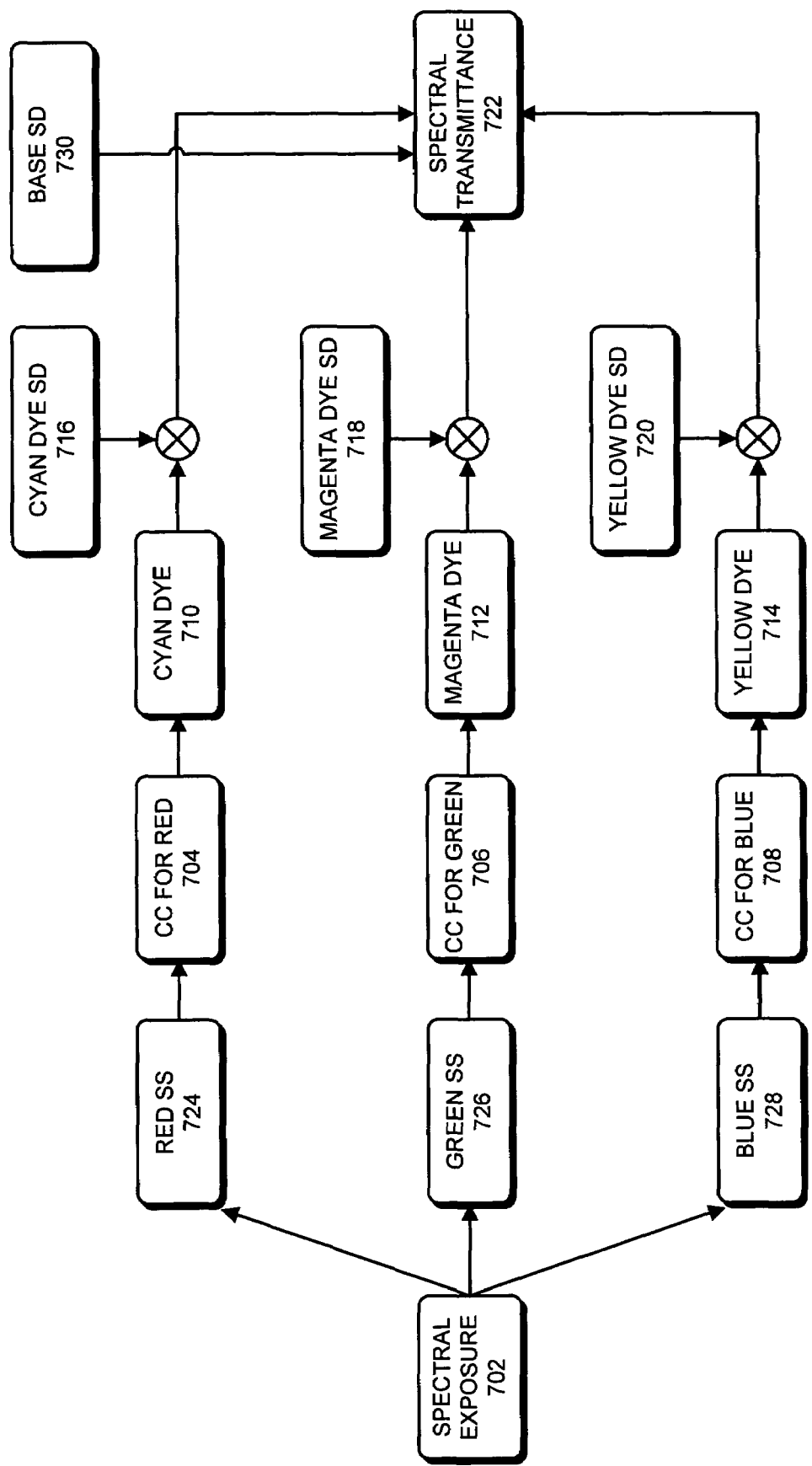
FIG. 7 illustrates a negative film model in accordance with an embodiment of the present invention.

FIG. 7 illustrates a negative film model in accordance with an embodiment of the present invention.

Spectral exposure 702 specifies the power spectrum of the incident light. Recall that a dye responds to the spectral exposure according to its spectral sensitivity curve. Hence, the effective exposures for the cyan, magenta, and yellow dyes can be determined using the spectral exposure 702 and the red spectral sensitivity 724, green spectral sensitivity 726, and blue spectral sensitivity 728, respectively. The cyan dye amount 710, magenta dye amount 712, and the yellow dye amount 714 can then be determined using the effective spectral exposures and the color negative film's characteristic curves for red 704, green 706, and blue 708, respectively. Once the cyan 710, magenta 712, and yellow 714 dye amounts are known, the spectral transmittance 722 of the color negative film can be determined using the base spectral density 730, and dye spectral density curves for cyan 716, magenta 718, and yellow 720, respectively.

In one embodiment, the recorder and the negative film can be calibrated so that the output values from the 1-dimension look-up tables for the lasers, namely, 604, 608, and 612, can be directly used as the cyan dye amount 710, magenta dye amount 712, and yellow dye amount 714, respectively.

Referring back to FIG. 5, printer model 506 models the behavior of a printer which prints the visual information contained in the color negative film onto a color positive film. Specifically, printer model 506 determines the power spectrum of the printer's light that is used to print the negative film. Note that, once we know the printer's light's power spectrum and the negative film's spectral transmittance, we can determine the power spectrum of the light that is incident on the color positive film by taking the product of the printer's light's power spectrum and the negative film's spectral transmittance.

Figure 8:
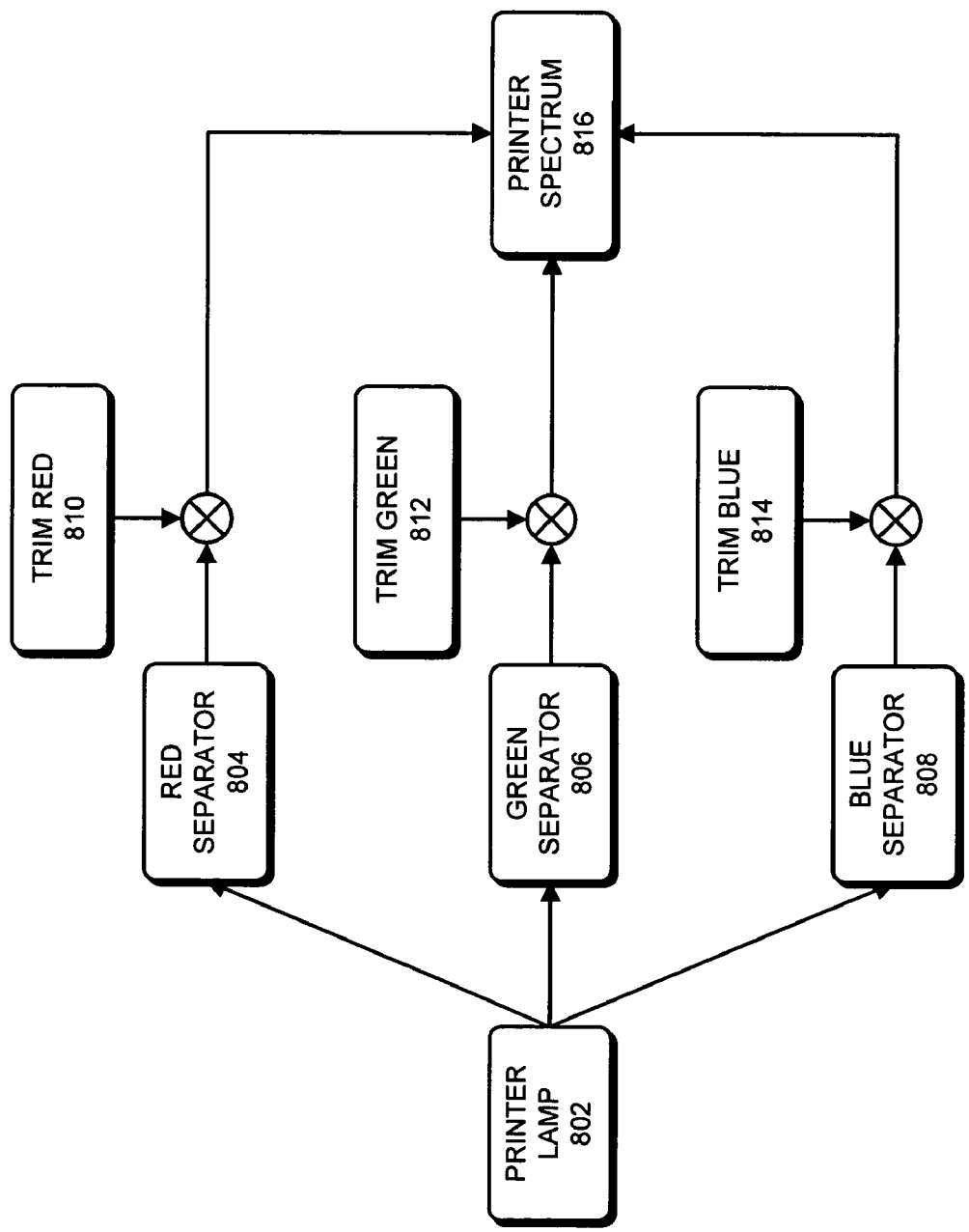
FIG. 8 illustrates a printer model in accordance with an embodiment of the present invention.

FIG. 8 illustrates a printer model in accordance with an embodiment of the present invention.

The light from printer lamp 802 is separated into its red, green, and blue components using red separator 804, green separator 806, and blue separator 808, respectively. Note that a color separator is a type of a filter, such as a dichroic mirror. Next, these color components are further modulated using red trim 810, green trim 812, and blue trim 814. Note that the red, green, and blue trims can be calibrated so that they generate LAD densities on the print film. Finally, the modulated color components are added to produce the printer's spectrum 816.

Referring back to FIG. 5, positive film model 508 models the behavior of the color positive film when it is exposed to the printer's light. Recall that we used printer model 506 and the negative film's spectral transmittance to determine the power spectrum of the light incident on the color positive film. Further, recall that a color positive film responds to a spectral exposure according to its characteristic curves. Hence, we can determine the dye densities using the power spectrum of the incident light and the characteristic curves. Note that each dye is associated with a spectral dye density curve. Hence, using the dye densities and the spectral dye density curves, we can determine the spectral transmittance of the color positive film.

In other words, the positive film model 508 determines the spectral transmittance of the positive film based on the power spectrum of the incident light. Note that each pixel in the digital picture file is associated with a region in the color positive film which, in turn, is associated with a spectral transmittance.

Figure 9:
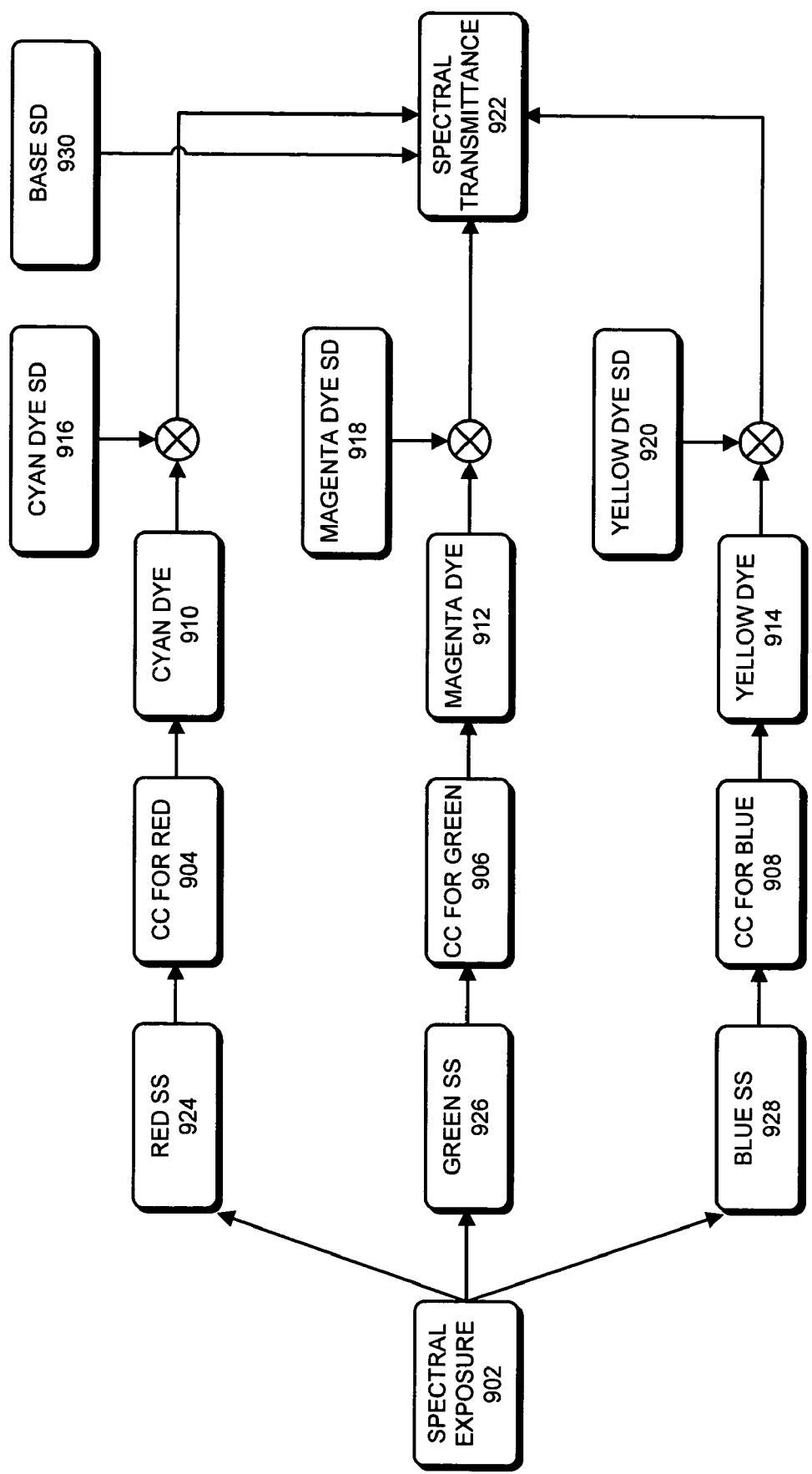
FIG. 9 illustrates a positive film model in accordance with an embodiment of the present invention.

FIG. 9 illustrates a positive film model in accordance with an embodiment of the present invention.

Spectral exposure 902 specifies the power spectrum of the incident light. Recall that a dye responds to the spectral exposure according to its spectral sensitivity curve. Hence, the effective exposures for the cyan, magenta, and yellow dyes can be determined using the spectral exposure 902 and the red spectral sensitivity 924, green spectral sensitivity 926, and blue spectral sensitivity 928, respectively. The cyan dye amount 910, magenta dye amount 912, and the yellow dye amount 914 can then be determined using the effective spectral exposures and the color positive film's characteristic curves for red 904, green 906, and blue 908, respectively. Once the cyan 910, magenta 912, and yellow 914 dye amounts are known, the spectral transmittance 922 of the color positive film can be determined using the base spectral density 930, and dye spectral density curves for cyan 916, magenta 918, and yellow 920, respectively.

Referring back to FIG. 5, projector model 510 models the behavior of a film projector as it projects the positive film on a theatre (or cinema) screen. Specifically, projector model 510 determines the spectral power distribution of the projector's light that is used to display the picture on the theatre screen. Note that, once we know the projector's light's power spectrum and the positive film's spectral transmittance, we can determine the spectral power distribution on the theatre screen.

In other words, the projector model 510 determines the spectral power distribution on the theatre screen based on the spectral transmittance of the color positive (or print) film. Note that each pixel in the digital picture file is associated with a region on the theatre screen which, in turn, is associated with a spectral power distribution.

Figure 10:
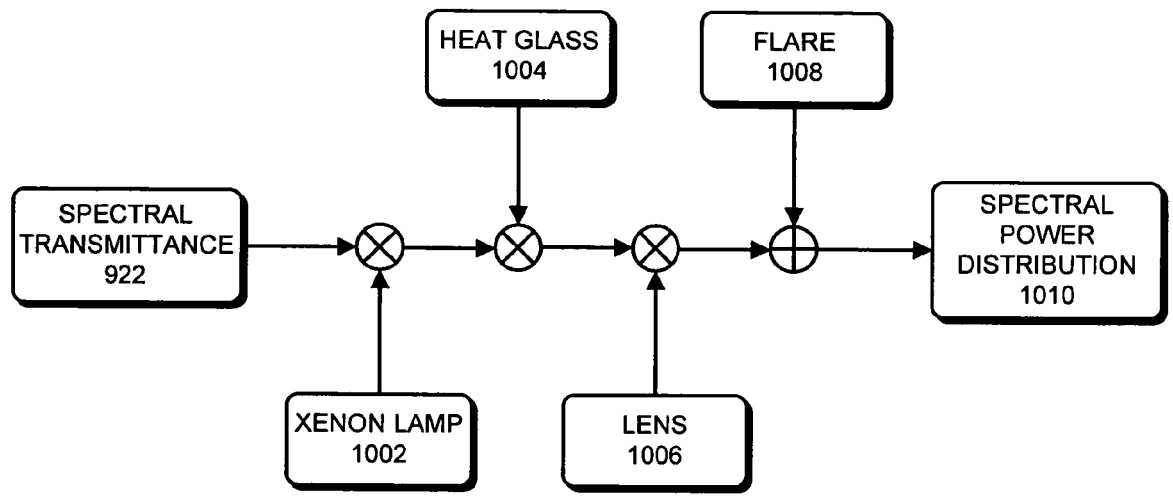
FIG. 10 illustrates a projector model in accordance with an embodiment of the present invention.

FIG. 10 illustrates a projector model in accordance with an embodiment of the present invention.

The power spectrum of the projector's light can be determined by modulating the xenon lamp 1002 by heat glass coefficient 1004 and lens coefficient 1006, and adding the contribution of flare 1008. Next, the spectral power distribution on the theatre screen 1010 can be determined using the spectral transmittance of the positive color film 922 and the power spectrum of the projector's light.

Note that the analytical model is not limited to a particular color space or file format. In one embodiment, the input digital picture file is in DPX format, whereas the output preview is in CIELAB color space. However, it will be apparent to one skilled in the art that other file formats and/or color spaces can also be used in the analytical model.

Process for Determining Characteristic Curves

The characteristic curves for the dye amounts (704, 706, 708, 904, 906, and 908) are an important part of the analytical models shown in FIG. 7 and FIG. 9. However, they are usually not available from the manufacturers. Hence, these characteristic curves need to be determined based on the available information.

Note that the Status M (or Status A) characteristic curves, which are frequently available from the manufacturers, specify the density values over a range of exposure levels for a light source that has a specified spectral pattern. However, the Status M (or Status A) characteristic curves do not specify the actual dye amounts. Note that we need to determine the actual dye amounts so that we can accurately determine the spectral transmittance of a film when it is exposed using a light source with an arbitrary spectral pattern.

One embodiment of the present invention uses the following important insight: we can determine the characteristic curves for the color channels using the Status M (or Status A) characteristic curves, the spectral dye density curves, and a standard pixel value that produces a standard dye density.

Figure 11:
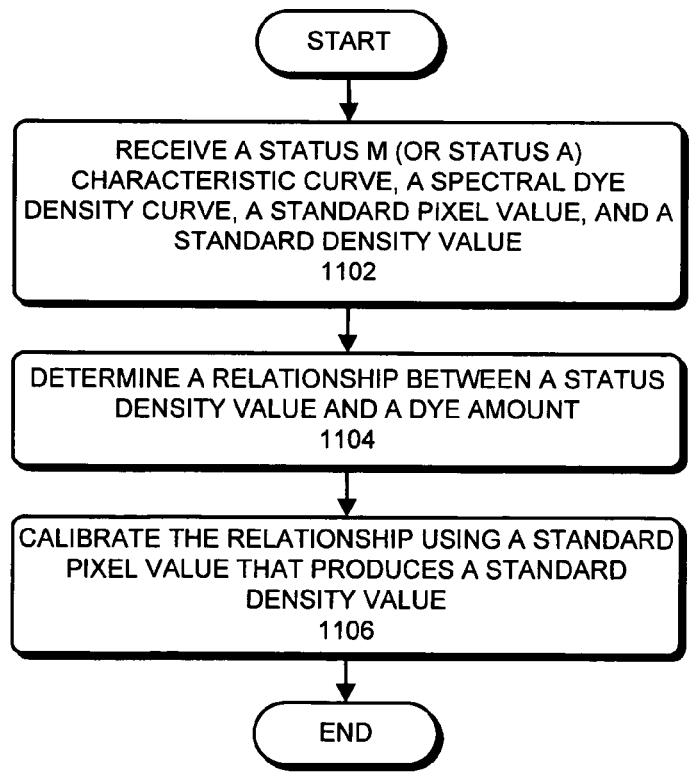
FIG. 11 presents a flowchart that illustrates a process for determining a characteristic curve that can accurately determine a dye density in a film when the film is exposed using a light source with an arbitrary spectral pattern in accordance with an embodiment of the present invention.

FIG. 11 presents a flowchart that illustrates a process for determining a characteristic curve that can accurately determine a dye density in a film when the film is exposed using a light source with an arbitrary spectral pattern in accordance with an embodiment of the present invention.

The process begins by receiving a Status M (or Status A) characteristic curve, a spectral dye density curve, a standard pixel value, and a standard density value (step 1102).

Next, the system determines a relationship between a status density value and a dye amount using the spectral dye density curve (step 1104).

In one embodiment, the relationship between a status density value and a dye amount can be represented by a mathematical expression. Specifically, in one embodiment, this relationship can be determined by solving for the dye amount which results in a target Status M (or Status A) density value using the dye density curves. Note that, in its present form, the relationship may not be able to determine an actual dye amount based on an actual exposure level because the relationship may not have been calibrated as yet.

The system then calibrates the relationship using the standard pixel value which produces the standard density value (step 1106). Note that the calibrated relationship is the characteristic curve that we were trying to determine. Further, note that the calibrated relationship can determine an actual dye amount based on an actual exposure level.

In one embodiment, the system calibrates the relationship using the standard DPX pixel value 445 which produces the standard Status M (or Status A) LAD densities as specified by the film manufacturer.

Process for Generating a Look-up Table Using an Analytical Model

Figure 12:
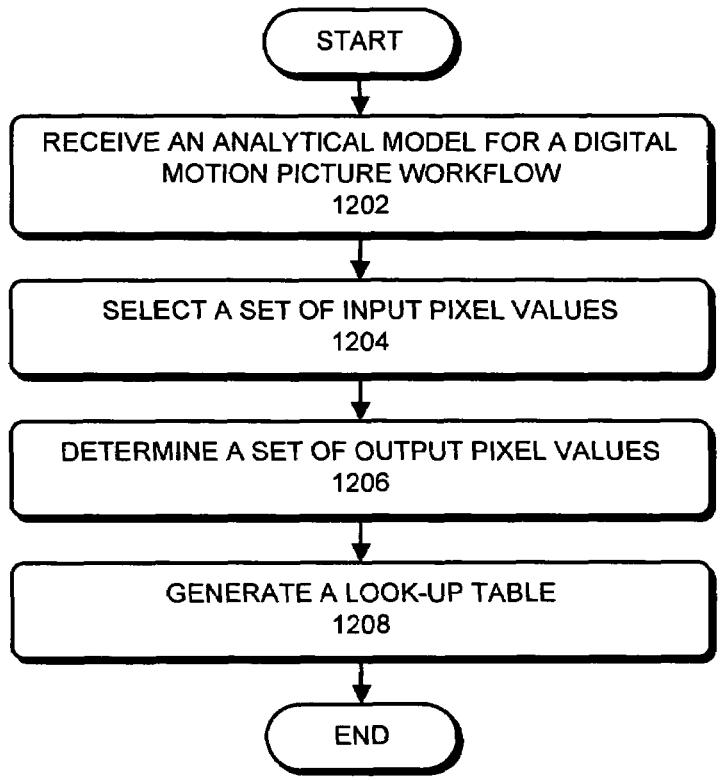
FIG. 12 presents a flowchart that illustrates a process for generating a look-up table using an analytical model in accordance with an embodiment of the present invention.

FIG. 12 presents a flowchart that illustrates a process for generating a look-up table using an analytical model in accordance with an embodiment of the present invention.

The process begins by receiving an analytical model for a digital motion picture workflow (step 1202).

Next, the system selects a set of input pixel values (step 1204). In one embodiment, the system selects 32×32×32=32,768 pixel values, wherein each pixel value is a combination of three color channel values, wherein each color channel value is selected from a range of 32 values.

The system then determines a set of output pixel values using the set of input pixel values and the analytical model (step 1206).

Finally, the system generates a look-up table by associating the set of input pixel values with the set of output pixel values (step 1208).

In one embodiment, the input pixel values are in DPX format, whereas the output pixel values are encoded in the CIELAB color space. Further, the look-up table can be represented and/or stored using a number of datastructures and/or formats. Specifically, in one embodiment, the look-up table is represented and/or stored using an ICC (International Color Consortium) profile.

In one embodiment, the look-up table has 32,768 elements which are stored in a 3-dimensional datastructure with 32 index values in each dimension. Note that each dimension of the look-up table can correspond to a color channel.

Process for Previewing Digital Picture Content

Figure 13:
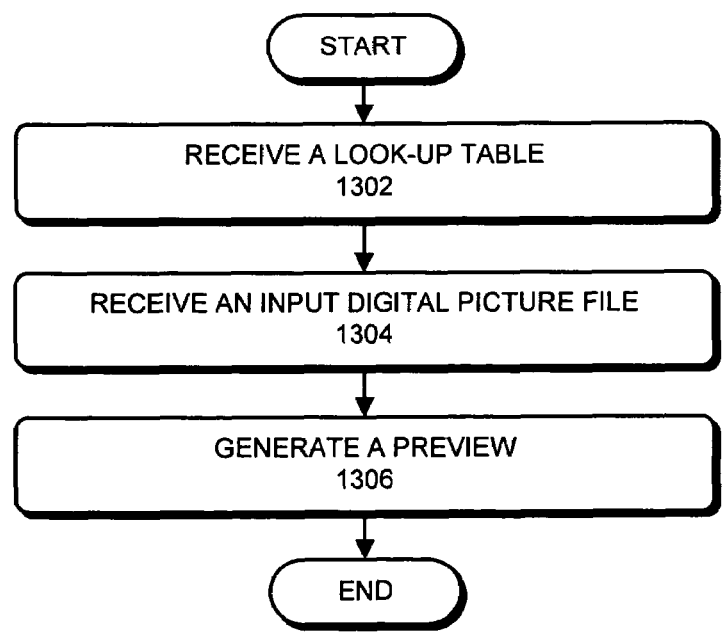
FIG. 13 presents a flowchart that illustrates a process for previewing digital motion picture content using a look-up table in accordance with an embodiment of the present invention.

FIG. 13 presents a flowchart that illustrates a process for previewing digital picture content using a look-up table in accordance with an embodiment of the present invention.

The process begins by receiving a look-up table which was generated using an analytical model for a digital motion picture workflow (step 1302).

Next, the system receives an input digital picture file that contains digital picture content (step 1304).

The system then generates a preview of the digital picture content using the pixel values in the input digital picture file and the look-up table (step 1306).

In one embodiment, the system generates the preview by performing a 3-dimensional look up using the three color channel values associated with a pixel in the input digital picture file.

Note that the system can generate the preview by directly using the analytical model, instead of first generating a look-up table, and then using the look-up table to generate the preview. Specifically, the system can receive an analytical model. Next, the system can generate a preview of the digital picture content using the pixel values in the input digital picture file and the analytical model.

Finally, note that embodiments of the present invention may not require time consuming and labor intensive manual operations, such as, processing films and measuring densities. Further, the analytical model can generate consistent and accurate results because it does not use measuring instruments and film processing techniques that usually introduce variations and noise. Finally, the analytical model is flexible, i.e., if one of the steps in the motion picture workflow is modified, only the corresponding component in the analytical model needs to be modified, instead of requiring the whole analytical model to be modified.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
performing the following in a computer:
generating an analytical model of a digital picture workflow, wherein the workflow is executable to convert an original digital image to a corresponding projected image projected onto a screen using a film projector, wherein the analytical model comprises a negative film model which models the behavior of the color negative film when the color negative film is exposed to light by a recorder, wherein the model is dependent, at least in part, on a film characteristic curve of the negative film, wherein the film characteristic curve indicates a relationship between an amount of exposure and a corresponding density of the negative film, and wherein the characteristic curve is determined using a method comprising:
receiving a status M film characteristic curve, a spectral dye density curve, a standard pixel value, and a standard density value;
determining, based at least in part on the spectral dye density curve, a relationship between a status M density value of the status M film characteristic curve and a dye amount; and
calibrating the relationship using the standard pixel value and the standard density value, wherein the calibrated relationship is usable to determine an actual dye amount based on an actual exposure level of the negative film;
selecting a set of input pixel values;
determining a set of output pixel values using the set of input pixel values and the analytical model; and
generating a look-up table by associating the set of input pixel values with the set of output pixel values;
wherein the look-up table is used to preview digital picture content.

2. The method of claim 1, wherein the analytical model further comprises:
a recorder model which models the behavior of a recorder that records the visual information contained in a digital picture file onto a color negative film;
a printer model which models the behavior of a printer that prints the visual information contained in the color negative film onto a color positive film;
a positive film model which models the behavior of the color positive film when the color positive film is exposed to light by the printer; and
a projector model which models the behavior of a film projector that projects the visual information contained in the positive film on a theatre screen.

3. The method of claim 2, wherein the positive film model uses a characteristic curve for the positive film, wherein the film characteristic curve for the positive film indicates a relationship between an amount of exposure and is determined by a method comprising:
receiving a status A film characteristic curve, a spectral dye density curve, a standard pixel value, and a standard density value;
determining, based at least in part on the spectral dye density curve, a relationship between a status A density value of the status A film characteristic curve and a dye amount; and calibrating the relationship using the standard pixel value and the standard density value, wherein the calibrated relationship is usable to determine an actual dye amount based on an actual exposure level of the positive film.

4. The method of claim 1,
wherein the input pixel values are in DPX format;
wherein the output pixel values are in CIELAB color space.

5. The method of claim 1, wherein the look-up table is represented using an ICC (International Color Consortium) profile.

6. A method, comprising:
performing the following in a computer:
generating a look-up table using an analytical model of a digital picture workflow, wherein the workflow is executable to convert an original digital image to a corresponding projected image projected onto a screen using a film projector, and wherein the analytical model comprises a negative film model which models the behavior of the color negative film when the color negative film is exposed to light by a recorder, wherein the model is dependent, at least in part, on a film characteristic curve of the negative film, wherein the film characteristic curve indicates a relationship between an amount of exposure and a corresponding density of the negative film, wherein the characteristic curve is determined using a method comprising:
receiving a status M film characteristic curve, a spectral dye density curve, a standard pixel value, and a standard density value;
determining, based at least in part on the spectral dye density curve, a relationship between a status M density value of the status M film characteristic curve and a dye amount; and
calibrating the relationship using the standard pixel value and the standard density value, wherein the calibrated relationship is usable to determine an actual dye amount based on an actual exposure level of the negative film;
receiving an input digital picture file that contains digital picture content; and
generating a preview of the digital picture content using the pixel values in the input digital picture file and the look-up table.

7. The method of claim 6, wherein the look-up table was generated by:
receiving the analytical model for the digital picture workflow;
selecting a set of input pixel values;
determining a set of output pixel values using the set of input pixel values and the analytical model; and
generating the look-up table by associating the set of input pixel values with the set of output pixel values.

8. The method of claim 6, wherein the analytical model further comprises:
a recorder model which models the behavior of a recorder that records the visual information contained in a digital picture file onto a color negative film;
a printer model which models the behavior of a printer that prints the visual information contained in the color negative film onto a color positive film;
a positive film model which models the behavior of the color positive film when the color positive film is exposed to light by the printer; and
a projector model which models the behavior of a film projector that projects the visual information contained in the positive film on a theatre screen.

9. The method of claim 8, wherein the positive film model uses a characteristic curve for the positive film, wherein the film characteristic curve for the positive film indicates a relationship between an amount of exposure and is determined by a method comprising:
receiving a status A film characteristic curve, a spectral dye density curve, a standard pixel value, and a standard density value;
determining, based at least in part on the spectral dye density curve, a relationship between a status A density value of the status A film characteristic curve and a dye amount; and
calibrating the relationship using the standard pixel value and the standard density value, wherein the calibrated relationship is usable to determine an actual dye amount based on an actual exposure level of the positive film.

10. The method of claim 6, wherein the look-up table is represented using an ICC (International Color Consortium) profile.

11. A computer-readable storage device storing instructions that when executed by a computer cause the computer to perform a method comprising:
generating an analytical model of a digital picture workflow, wherein the workflow is executable to convert an original digital image to a corresponding projected image projected onto a screen using a film projector, wherein the analytical model comprises a negative film model which models the behavior of the color negative film when the color negative film is exposed to light by a recorder, wherein the model is dependent, at least in part, on a film characteristic curve of the negative film, wherein the film characteristic curve indicates a relationship between an amount of exposure and a corresponding density of the negative film, wherein the characteristic curve is determined using a method comprising:
receiving a status M film characteristic curve, a spectral dye density curve, a standard pixel value, and a standard density value;
determining, based at least in part on the spectral dye density curve, a relationship between a status M density value of the status M film characteristic curve and a dye amount; and
calibrating the relationship using the standard pixel value and the standard density value, wherein the calibrated relationship is usable to determine an actual dye amount based on an actual exposure level of the negative film;
selecting a set of input pixel values;
determining a set of output pixel values using the set of input pixel values and the analytical model; and
generating a look-up table by associating the set of input pixel values with the set of output pixel values;
wherein the look-up table can be used to preview digital picture content.

12. The computer-readable storage device of claim 11, wherein the analytical model further comprises:
a recorder model which models the behavior of a recorder that records the visual information contained in a digital picture file onto a color negative film;
a printer model which models the behavior of a printer that prints the visual information contained in the color negative film onto a color positive film;
a positive film model which models the behavior of the color positive film when the color positive film is exposed to light by the printer; and
a projector model which models the behavior of a film projector that projects the visual information contained in the positive film on a theatre screen.

13. The computer-readable storage device of claim 12, wherein the positive film model uses a characteristic curve for the positive, wherein the film characteristic curve for the positive film indicates a relationship between an amount of exposure and is determined by a method comprising:
   receiving a status A film characteristic curve, a spectral dye density curve, a standard pixel value, and a standard density value;
   determining, based at least in part on the spectral dye density curve, a relationship between a status A density value of the status A film characteristic curve and a dye amount; and
   calibrating the relationship using the standard pixel value and the standard density value, wherein the calibrated relationship is usable to determine an actual dye amount based on an actual exposure level of the positive film.

14. The computer-readable storage device of claim 11, wherein the input pixel values are in DPX format:
   wherein the output pixel values are in CIELAB color space.

15. The computer-readable storage device of claim 11, wherein the look-up table is represented using an ICC (International Color Consortium) profile.

16. A computer-readable storage device storing instructions that when executed by a computer cause the computer to perform a method comprising:
   generating a look-up table using an analytical model of a digital picture workflow, wherein the workflow is executable to convert an original digital image to a corresponding projected image projected onto a screen using a film projector, wherein the analytical model comprises a negative film model which models the behavior of the color negative film when the color negative film is exposed to light by a recorder, wherein the model is dependent, at least in part, on a film characteristic curve of the negative film, wherein the film characteristic curve indicates a relationship between an amount of exposure and a corresponding density of the negative film, wherein the characteristic curve is determined using a method comprising:
   receiving a status M film characteristic curve, a spectral dye density curve, a standard pixel value, and a standard density value;
   determining, based at least in part on the spectral dye density curve, a relationship between a status M density value of the status M film characteristic curve and a dye amount; and
   calibrating the relationship using the standard pixel value and the standard density value, wherein the calibrated relationship is usable to determine an actual dye amount based on an actual exposure level of the negative film;
   receiving an input digital picture file that contains digital picture content; and
   generating a preview of the digital picture content using the pixel values in the input digital picture file and the look-up table.

17. The computer-readable storage device of claim 16, wherein the look-up table was generated by:
   receiving the analytical model for the digital picture workflow;
   selecting a set of input pixel values;
   determining a set of output pixel values using the set of input pixel values and the analytical model; and
   generating the look-up table by associating the set of input pixel values with the set of output pixel values.

18. The computer-readable storage device of claim 16, wherein the analytical model further comprises:
   a recorder model which models the behavior of a recorder that records the visual information contained in a digital picture file onto a color negative film;
   a printer model which models the behavior of a printer that prints the visual information contained in the color negative film onto a color positive film;
   a positive film model which models the behavior of the color positive film when the color positive film is exposed to light by the printer; and
   a projector model which models the behavior of a film projector that projects the visual information contained in the positive film on a theatre screen.

19. The computer-readable storage device of claim 18, wherein the positive film model uses a characteristic curve for the positive film, wherein the film characteristic curve for the positive film indicates a relationship between an amount of exposure and is determined by a method comprising:
   receiving a status A film characteristic curve, a spectral dye density curve, a standard pixel value, and a standard density value;
   determining, based at least in part on the spectral dye density curve, a relationship between a status A density value of the status A film characteristic curve and a dye amount; and
   calibrating the relationship using the standard pixel value and the standard density value, wherein the calibrated relationship is usable to determine an actual dye amount based on an actual exposure level of the positive film.

20. The computer-readable storage device of claim 16, wherein the look-up table is represented using an ICC (International Color Consortium) profile.

21. A computer-readable storage device storing instructions that when executed by a computer cause the computer to perform a method comprising:
   generating an analytical model of a digital picture workflow, wherein the workflow is executable to convert an original digital image to a corresponding projected image projected onto a screen using a film projector, wherein the analytical model comprises a negative film model which models the behavior of the color negative film when the color negative film is exposed to light by a recorder, wherein the model is dependent, at least in part, on a film characteristic curve of the negative film, wherein the film characteristic curve indicates a relationship between an amount of exposure and a corresponding density of the negative film, wherein the characteristic curve is determined using a method comprising:
   receiving a status M film characteristic curve, a spectral dye density curve, a standard pixel value, and a standard density value;
   determining, based at least in part on the spectral dye density curve, a relationship between a status M density value of the status M film characteristic curve and a dye amount; and
   calibrating the relationship using the standard pixel value and the standard density value, wherein the calibrated relationship is usable to determine an actual dye amount based on an actual exposure level of the negative film;
   receiving an input digital picture file that contains digital picture content; and
   generating a preview of the digital picture content using the pixel values in the input digital picture file and the analytical model.

22. The computer-readable storage device of claim 21, wherein the analytical model further comprises:
- a recorder model which models the behavior of a recorder that records the visual information contained in a digital picture file onto a color negative film;
- a printer model which models the behavior of a printer that prints the visual information contained in the color negative film onto a color positive film;
- a positive film model which models the behavior of the color positive film when the color positive film is exposed to light by the printer; and
- a projector model which models the behavior of a film projector that projects the visual information contained in the positive film on a theatre screen.

* * * * *

UNITED STATES PATENT AND TRADEMARK OFFICE
CERTIFICATE OF CORRECTION

PATENT NO. : 7,667,880 B2
APPLICATION NO. : 11/351757
DATED : February 23, 2010
INVENTOR(S) : Lars U. Borg It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 732 days.

Signed and Sealed this

Seventh Day of December, 2010

David J. Kappos
*Director of the United States Patent and Trademark Office*